Nov. 21, 1939.  E. W. SAIBERLICH  2,180,838
CROP BLOWER
Filed Nov. 29, 1937  3 Sheets-Sheet 1

INVENTOR
ERWIN W. SAIBERLICH
BY
ATTORNEYS

Nov. 21, 1939.  E. W. SAIBERLICH  2,180,838
CROP BLOWER
Filed Nov. 29, 1937   3 Sheets-Sheet 2

INVENTOR
ERWIN W. SAIBERLICH
BY

ATTORNEYS

Nov. 21, 1939. E. W. SAIBERLICH 2,180,838
CROP BLOWER
Filed Nov. 29, 1937 3 Sheets-Sheet 3
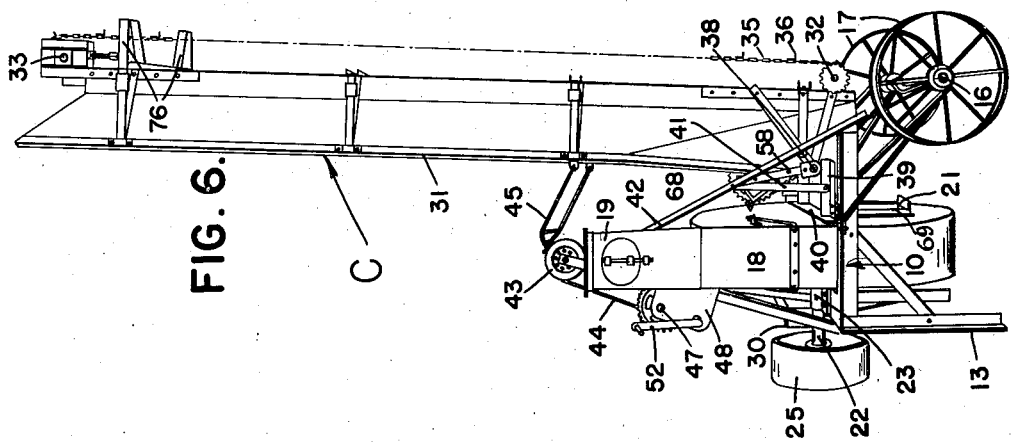
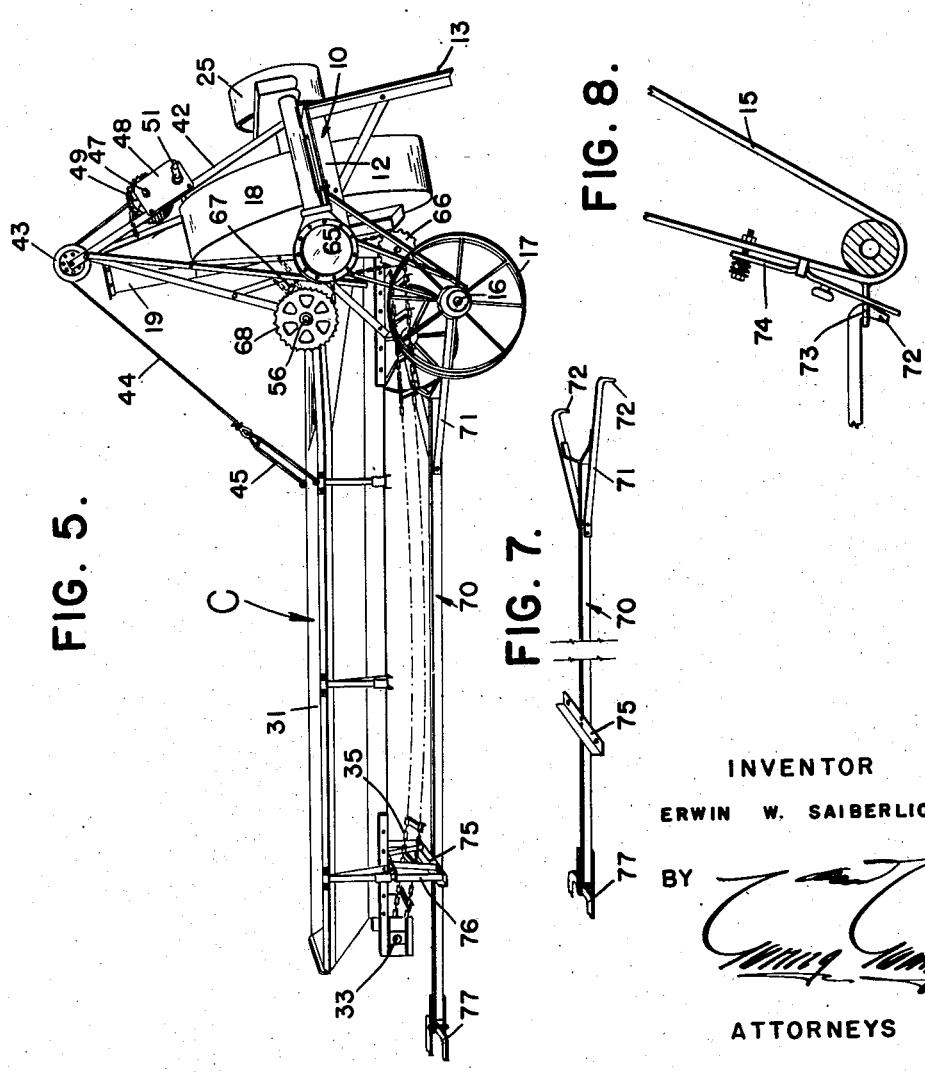
INVENTOR
ERWIN W. SAIBERLICH
BY
ATTORNEYS Patented Nov. 21, 1939

2,180,838

UNITED STATES PATENT OFFICE 2,180,838

CROP BLOWER

Erwin W. Saiberlich, Appleton, Wis., assignor to Fox River Tractor Company, Appleton, Wis.

Application November 29, 1937, Serial No. 177,063

2 Claims. (Cl. 302—11)

This invention appertains to crop blowers, and more particularly to a novel machine for filling silos and other storage buildings with desired material.

One of the primary objects of my invention is to provide a crop blower in which all of the parts are balanced on the frame in such a manner that the device can be readily pulled long distances by a tractor or the like, or moved by hand, similar to a wheelbarrow, from one place to another.

Another salient object of my invention is to provide a crop blower embodying a frame having an endless conveyor for the material hingedly connected at its forward end to the frame, and a blower mounted on the frame directly in front of the conveyor, whereby a compact structure will be had, which will be convenient to move from one place to another, and one which will occupy a minimum amount of space when not in use.

A further object of my invention is to provide a light running crop blower embodying a frame for rigidly supporting the blower and for hingedly carrying the endless conveyor, the intake opening of the blower being below and at one side of the axial center of the blower and on the same side as the blower outlet, whereby the conveyor can extend straight into the inlet opening without forward rise, and whereby the blower can effectively handle a large quantity of material, and whereby the material will be blown through the blower with less friction therein.

A further important object of my invention is to provide a crop blower embodying a relatively short frame having supporting legs at the front thereof and a pair of supporting wheels at the rear thereof, and a blower rigidly mounted on the frame between the pair of supporting legs and the wheels, and an endless conveyor hingedly mounted at its forward end to the frame above the wheels, means being provided on the frame for raising and lowering the conveyor.

A further object of my invention is to provide a crop blower of the above character in which, when the conveyor is in its lowered position, the frame can be tilted on the wheels, whereby to permit the easy movement of the device from one place to another.

A further object of my invention is to provide a novel leveler reel mounted directly above the outlet end of the conveyor and in front of the intake opening of the blower, the reel being adapted to rotate in a direction opposite to the path of movement of the endless conveyor, whereby to throw back the material from the inlet opening to prevent clogging of the blower.

A still further object of my invention is to provide novel means for detachably connecting a tongue with the frame and the outer end of the conveyor, so that the crop blower can be readily connected to a tractor or other drawing vehicle.

With these and other objects in view, the invention consists in the novel construction, arrangement, and formation of parts, as will be hereinafter more specifically described, claimed, and illustrated in the accompanying drawings, in which drawings:

Figure 5 is a perspective view of the crop blower, looking from one side thereof and showing the same with the tongue attached to permit the crop blower to be drawn from one place to another.

Figure 6 is a perspective view of the crop blower, looking from the other side from Figure 5 and showing the endless conveyor in its completely raised position.

Figure 7 is a detail perspective view of the tongue.

Figure 8 is an enlarged, detail sectional view illustrating one means for detachably connecting the tongue to the frame.

Figure 1:
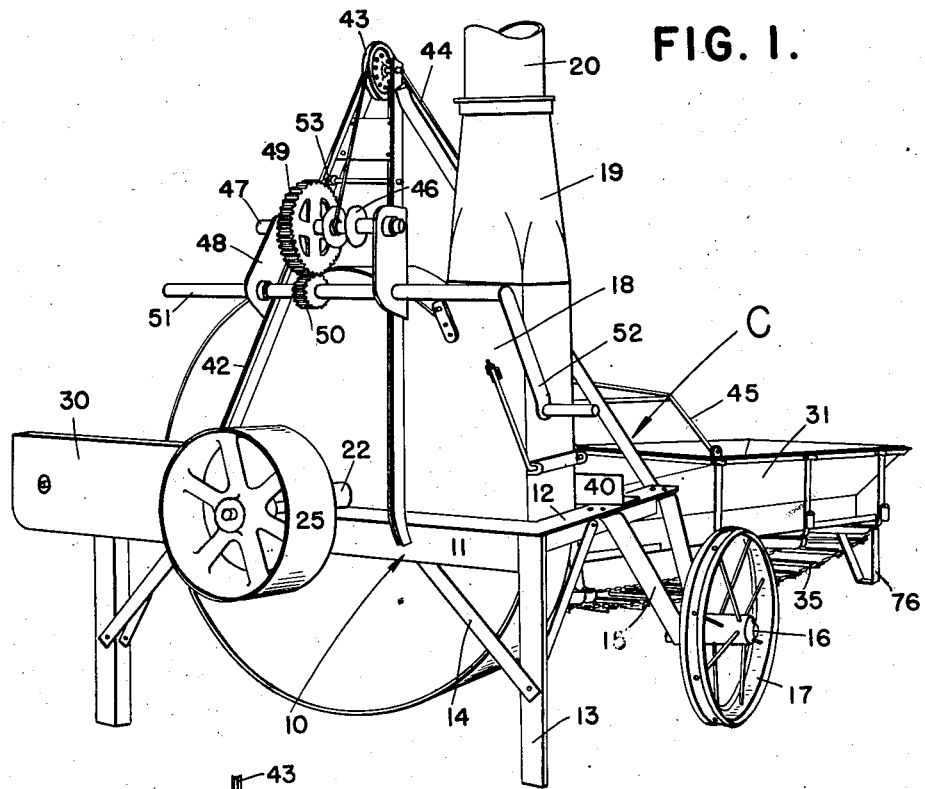
Figure 1 is a perspective view of my novel crop blower, looking from the forward end thereof.

Referring to the drawings in detail, wherein similar reference characters designate corresponding parts throughout the several views, the letter C generally indicates my improved crop blower, which includes a main supporting frame 10 preferably fabricated from angle iron or the like for structural strength.

As illustrated, the frame 10 includes a front transverse angle bar 11, and rearwardly directed parallel side bars 12. Secured to the corners of the frame are depending legs or standards 13, and braces 14 are utilized for connecting the legs with the top angle bars. The rear end of the frame has rigidly bolted, riveted, or welded thereto downwardly and rearwardly extending brackets 15 for supporting the wheel spindles 16 on which are rotatably mounted the ground wheels 17.

Rigidly mounted within the top frame is the blower casing 18, and suitable braces can be utilized for securing the blower casing in place. This blower casing is provided with a tangentially extending outlet 19, to which is adapted to be connected the blower pipes 20 for conveying material to a silo or the like.

The rear face of the blower casing has formed therein the intake opening 21, and attention is particularly directed to the fact that this opening is located below and at one side of the axial center of the casing and on the same side of the casing as the blower outlet 19.

Extending into the axial center of the blower casing is the main drive shaft, and this shaft can be mounted in any preferred type of bearings 23 carried by the frame 10. The inner end of the shaft was keyed or otherwise secured thereto the hub of the blower wheel 24. A drive pulley 25 is keyed or otherwise secured to the outer end of the shaft 22, whereby said shaft can be driven from a tractor or a stationary engine, as may be preferred.

The drive for the various other operating parts of the device is taken from the shaft 22, and hence this shaft has keyed or otherwise secured thereto a sprocket wheel 26, over which is trained a sprocket chain 27 leading to a sprocket wheel or V pulley 28 fastened to a jack or counter-shaft 29. This shaft 29 extends in parallel relation to the shaft 22 and is rotatably mounted in any preferred type of bearings mounted on the frame 10. If desired, a protecting housing 30 can be placed around the sprocket wheels 26 and 28 and over the chain 27.

Hingedly mounted on the frame is the rearwardly directed conveyor 31, and this conveyor can be of a troughlike shape formed from sheet metal of the desired gauge.

The opposite ends of the trough, below the bottom wall thereof, carry transversely extending shafts 32 and 33, to which are keyed the sprocket wheels 34 for the endless conveyor chains 35. These chains carry suitable flights 36, and the flights carried by the top runs of the chains travel over the bottom wall of the conveyor trough. Any suitable means can be provided for taking up slack in the endless conveyor.

One of the salient features of the invention is the fact that the conveyor is hingedly mounted on the frame, so that the conveyor can be swung to a raised and lowered position. Thus, the conveyor trough, adjacent its forward end, carries bearings 37, which are mounted upon a transversely extending shaft 38 carried by the frame 10. Suitable braces are provided for supporting the bearings on the trough, and the bearings on the frame can be mounted upon rearwardly projecting angle bars 39 rigidly secured to a crossbeam 40 connected with the side bars 12.

The angle bars 39 are also supported by braces 41 leading from the derrick tower 42. This derrick tower can be constructed from angle iron, and the legs or standards thereof have their lower ends rigidly secured to the corners of the frame. The upper end of the derrick tower 42 rotatably supports a pulley sheave 43, over which is trained a pull cable 44.

One end of the cable is attached to a yoke 45 pivotally connected to the trough, and the other end of the cable is wound about a windlass drum 46. The windlass drum is keyed or otherwise secured to a shaft 47 rotatably mounted in bearing plates 48 mounted upon the tower. This shaft is also provided with a gear wheel 49, which meshes with a pinion 50 attached to the hand shaft 51. This hand shaft 51 is also rotatably mounted in the bearing plates 48, and either end of the shaft carries a hand crank 52, whereby the windlass drum can be rotated.

From the foregoing description, it can be seen that by turning the crank 52, the cable 44 can be wound upon the drum, and that the trough and its endless conveyor can be raised and lowered. A pivoted dog 53 is provided for engaging the gear wheel 49, so as to hold the drum against movement and the conveyor in a preferred position.

Mounted above the inner end of the conveyor is a leveler reel 54. This leveler reel includes outwardly extending material-engaging prongs 55, and the reel is secured to a shaft 56. The shaft 56 is rotatably mounted in suitable bearings 57 carried by forwardly extending arms 58 rockably mounted on the frame 10. Thus, the leveler reel is free to float relative to the conveyor, and downward movement of the leveler reel can be limited by chains 59.

The leveler reel and the endless conveyor are driven from the counter-shaft 29, and thus the rear end of this counter-shaft has keyed or otherwise secured thereto a beveled pinion 60, which meshes with a bevel gear 61 carried by a transversely extending shaft 62 arranged in front of the blower casing.

This shaft is mounted in suitable bearings carried by the frame, and the shaft and the meshing beveled gears can be housed within a suitable casing. The inner end of the shaft 62 has secured thereto spaced sprocket wheels 63 and 64. The sprocket wheel 63 has trained thereabout a drive sprocket chain 65, which leads over a sprocket wheel 66 keyed or otherwise secured to the front conveyor shaft 32. The sprocket wheel 64 has trained thereover a sprocket chain 67, which leads over a sprocket wheel 68 keyed or otherwise secured to the leveler reel shaft 56.

Figure 2:
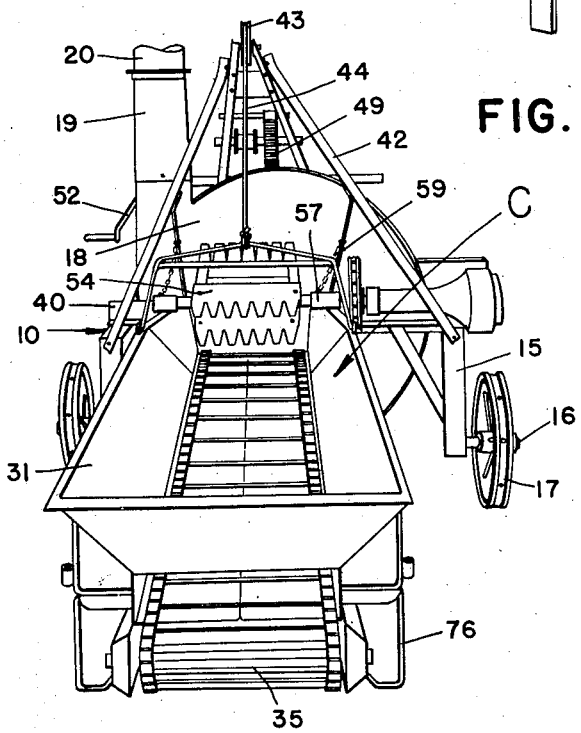
Figure 2 is a perspective view of the crop blower, looking from the rear end.
Figure 3:
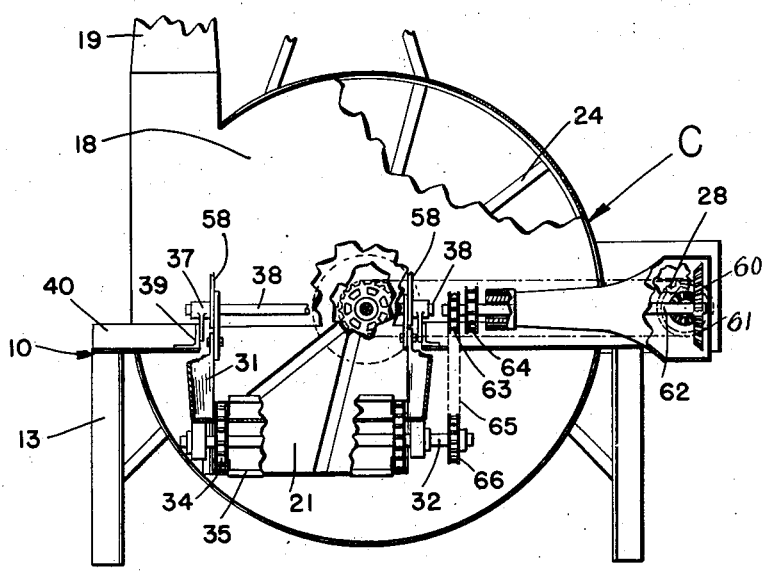
Figure 3 is a transverse section through the device, with parts thereof broken away and in section, illustrating the novel means employed for actuating the conveyor and other operating parts.
Figure 4:
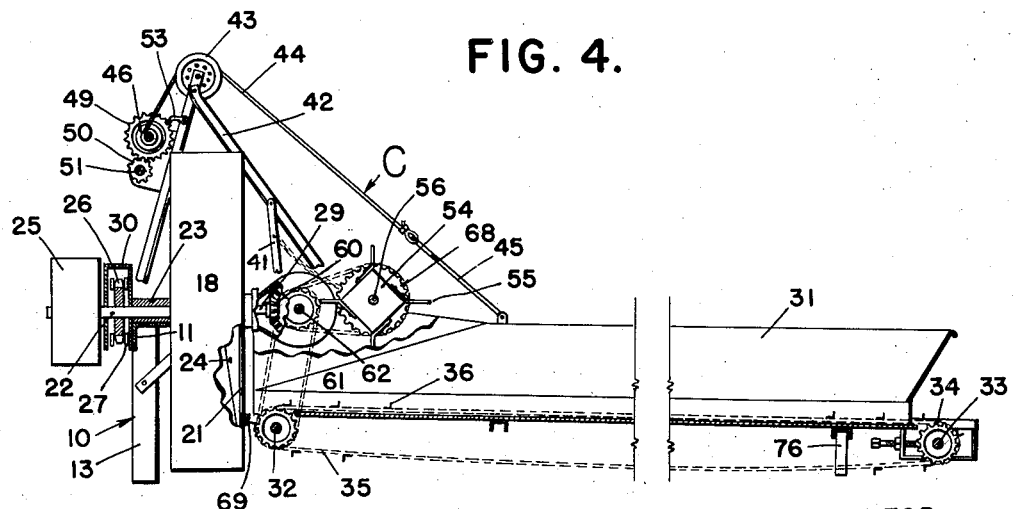
Figure 4 is a longitudinal section through the device, with parts thereof broken away and in section, illustrating the position of the leveler reel relative to the endless conveyor and the blower inlet opening.

In Figures 1 and 2, the conveyor is shown in its lowered position for receiving material to be stored, and thus persons can stand on either side of the conveyor and toss the material into the trough, and the endless conveyor will carry the material into the blower through the eccentrically disposed opening 21. The margin of this opening can be reinforced by angle bars 69, which also serve as means for guiding the material into the blower.

As the opening is below the axial center of the blower casing, the conveyor can extend directly into the opening, and hence the conveyor trough does not have to be provided with an upwardly inclined portion. Likewise, the opening 21 being eccentrically disposed and on the same side of the blower casing as the outlet, the material only travels a short distance in the blower casing, and the handling capacity of the blower is increased, and the friction of the material on the walls of the blower casing is decreased.

In Figure 6, the conveyor is shown in its raised position, and obviously the device can be easily moved by hand from one place to another, and the same will occupy a minimum amount of space when not in use.

In Figure 5, the device is shown with the conveyor in a partially lowered position, and with the conveyor swung down, so that the frame 10 will pivot about the ground wheels to raise the legs of the frame above the ground. In this position the device can be moved wheelbarrow fashion by hand or long distances by a drawing vehicle. A tongue 70 is provided for permitting the device to be attached to a tractor or other drawing vehicle.

The tongue 70 can take various forms, but, as illustrated, the same has its rear end forked, as at 71, and provided with depending hooks 72 for engaging through eyes 73 on the wheel brackets. Rockable spring-pressed latch plates 74 are provided for engaging the hooks to prevent displacement thereof from the eyes. The tongue, adjacent its forward end, can carry a cross-bar 75, which is adapted to be attached to the depending bracket legs 76 carried by the conveyor trough adjacent its rear end. Any preferred type of hitch 77 can be utilized for connecting the tongue with a drawbar.

Attention is directed to the fact that the leveler reel 54 rotates in a direction opposite the travel of the top run of the conveyor belt, and thus should the material crowd about the blower intake opening, the leveler reel will effectively function to throw the material back onto the conveyor.

Likewise, by using this leveler reel I am enabled to thoroughly mix crude molasses or the like with feed material at the time of the storing thereof.

Changes in details may be made without departing from the spirit or the scope of my invention, but what I claim as new is:

1. A crop blower comprising a frame, depending front legs secured to the frame, rearwardly extending wheel brackets on the rear end of the frame, ground wheels rotatably carried by the brackets, a blower casing rigidly secured to the frame and extending transversely thereof and to the line of travel of the crop blower, a longitudinally extending conveyor hingedly connected to the frame in rear of the blower, said conveyor extending parallel with the line of travel of the crop blower, the frame being rockable on the wheels, and means for raising and lowering the conveyor on the frame and holding the same in a desired position, whereby the frame and conveyor can be swung as a unit on the wheels to lift the legs above the wheels and ground.

2. A crop blower comprising a frame, depending front legs secured to the frame, rearwardly extending wheel brackets on the rear end of the frame, ground wheels rotatably carried by the brackets, a blower casing rigidly secured to the frame and extending transversely thereof and to the line of travel of the crop blower, a longitudinally extending conveyor hingedly connected to the frame in rear of the blower, said conveyor extending parallel with the line of travel of the crop blower, the frame being rockable on the wheels, means for raising and lowering the conveyor on the frame and holding the same in a desired position, whereby the frame and conveyor can be swung as a unit on the wheels to lift the legs above the wheels and ground, and means for hauling the crop blower from the outer end of the conveyor.

ERWIN S. SAIBERLICH.